(12) United States Patent
Aon et al.

(10) Patent No.: US 9,596,557 B2
(45) Date of Patent: Mar. 14, 2017

(54) SUBSCRIBER IDENTIFICATION MODULE ("SIM") BASED MACHINE-TO-MACHINE ("M2M") CLIENT SYSTEMS, METHODS, AND APPARATUSES

(71) Applicant: Cellco Partnership, Basking Ridge, NJ (US)

(72) Inventors: Projit Aon, Princeton Junction, NJ (US); Bradley J. Seipp, Carlsbad, CA (US)

(73) Assignee: Cellco Partnership, Basking Ridge, NJ (US)

( * ) Notice: Subject to any disclaimer, the term of this patent is extended or adjusted under 35 U.S.C. 154(b) by 199 days.

(21) Appl. No.: 14/146,511

(22) Filed: Jan. 2, 2014

(65) Prior Publication Data

US 2015/0189459 A1 Jul. 2, 2015

(51) Int. Cl.
*H04W 4/00* (2009.01)
*H04W 8/18* (2009.01)
*H04W 84/04* (2009.01)

(52) U.S. Cl.
CPC .......... *H04W 4/005* (2013.01); *H04W 8/183* (2013.01); *H04W 84/04* (2013.01)

(58) Field of Classification Search
CPC  H04B 1/3816; H04M 2250/14; H04W 4/005; H04W 84/04; H04W 8/183
USPC ........................................................ 455/558
See application file for complete search history.

(56) References Cited

U.S. PATENT DOCUMENTS

| | | | | |
|---|---|---|---|---|
| 2008/0064393 A1* | 3/2008 | Oommen | ............... | H04W 48/18 455/432.1 |
| 2009/0048493 A1* | 2/2009 | James | ................ | G06F 19/3481 600/300 |
| 2011/0223971 A1* | 9/2011 | Dewey | ................ | H04L 12/6418 455/558 |
| 2012/0140676 A1* | 6/2012 | Kim | .................... | H04M 1/7253 370/254 |
| 2012/0196570 A1* | 8/2012 | Lindholm | ............... | H04W 8/26 455/411 |
| 2013/0097317 A1* | 4/2013 | Sheleheda | ............. | H04W 4/005 709/225 |
| 2013/0162160 A1* | 6/2013 | Ganton | .................. | H05B 37/02 315/210 |
| 2013/0188515 A1* | 7/2013 | Pinheiro | ............... | H04W 4/001 370/254 |

* cited by examiner

*Primary Examiner* — Nathan Mitchell

(57) ABSTRACT

Exemplary subscriber identification module ("SIM") based machine-to-machine ("M2M") client systems, methods, and apparatuses are described herein. An exemplary M2M device includes an M2M SIM client implemented on a SIM card installed in the M2M device. The M2M SIM client provides a platform messaging interface through which the M2M device communicates with an M2M platform, provides a device-side interface through which the M2M device interfaces with the M2M SIM client, and provides a set of one or more M2M services to the M2M device. The set of M2M services may include one or more of the exemplary M2M services described herein. Corresponding systems, methods, and apparatuses are also described.

22 Claims, 6 Drawing Sheets

SUBSCRIBER IDENTIFICATION MODULE ("SIM") BASED MACHINE-TO-MACHINE ("M2M") CLIENT SYSTEMS, METHODS, AND APPARATUSES

BACKGROUND INFORMATION

Machine-to-machine ("M2M") technology is a growing industry designed to communicatively connect machines to one another. An M2M solutions provider uses M2M technology to provide an M2M solution to a customer. For example, an M2M solutions provider may provide a customer such as a trucking company with an M2M solution that communicatively connects the trucking company's fleet of trucks to a company computing system (e.g., a personal or server computer operated by the trucking company) by way of a wireless network. Company personnel may utilize the company computing system to monitor, analyze, and/or control the fleet of trucks by way of the M2M solution.

An M2M solutions provider may provide an M2M solution over an M2M platform. Such an M2M solution may be said to be built on the M2M platform, with the M2M platform providing foundational functionality to support the M2M solution. For example, the M2M platform may provide underlying functionality that establishes communication paths and routes communications between a customer computing system and in-field customer assets as part of an M2M solution.

In an M2M solution built on an M2M platform, M2M device clients are typically integrated into wireless devices deployed in the field together with in-field customer assets and configured to provide an interface between the customer assets and an M2M platform. For example, an M2M device client may be integrated into a wireless device deployed on a truck included in a customer's fleet of trucks. The wireless device may interface with the truck to receive data representative of operational parameters of the truck (e.g., truck location, speed, direction, fuel level, etc.). Using functionality of the integrated M2M device client, the wireless device may send the data to the M2M platform. Additionally or alternatively, through the integrated M2M device client, the wireless device may receive and use communications provided by the M2M platform to configure the wireless device and/or to control operations of the truck.

Because of the wide variety of potential use cases for M2M solutions and/or types of wireless devices used to connect in-field assets to an M2M platform, the integration of an M2M device client in a wireless device is typically not standardized and may often require customization particular to the corresponding use case and/or wireless device. This is problematic for a provider of an M2M platform and/or solution, especially when the provider does not manufacture the wireless device. In such a situation, the provider typically has to spend valuable resources working with an original equipment manufacturer ("OEM") and/or M2M solution customer to integrate an M2M device client in a wireless device to configure the wireless device to communicate with the M2M platform and access the M2M solution.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary subscriber identification module ("SIM") based M2M client systems, methods, and apparatuses are described herein. As described herein, an M2M SIM client may be implemented in a SIM card configured to be installed in a wireless-communication-enabled device ("wireless device"). For example, the M2M SIM client may be loaded onto or otherwise implemented as part of a SIM on the SIM card. With the SIM card installed in the wireless device, the M2M SIM client may provide one or more M2M services of an M2M platform and/or solution to the wireless device (e.g., to a device-side client installed on the wireless device).

As an example, an exemplary wireless M2M device may include a SIM card installed in the M2M device and an M2M SIM client implemented on the SIM card. The M2M SIM client may provide a platform messaging interface through which the M2M device communicates with an M2M platform subsystem by way of a wireless network, provide a device-side interface through which the M2M device interfaces with the M2M SIM client (e.g., through which a device-side client installed on the M2M device interfaces with the M2M SIM client), and provide a set of one or more M2M services to the M2M device (e.g., to the device-side client installed on the M2M device). Examples of M2M services that may be provided by the M2M SIM client are described herein.

The exemplary SIM based M2M client systems, methods, and apparatuses described herein may facilitate universal, standardized, and/or efficient integration of wireless devices with an M2M platform and/or solution. As an example, by using an M2M SIM client, a provider of an M2M platform and/or solution may be able to work with a manufacturer of a SIM to implement the M2M SIM client on the SIM rather than having to expend resources working with an array of OEMs to integrate different versions of an M2M SIM client into a variety of wireless devices across different vertical M2M solutions. As another example, development of a device-side client by a customer of an M2M solution may be simplified by leveraging the M2M service provided by the M2M SIM client. These and other benefits that may be provided by systems, methods, and/or apparatuses described herein will be made apparent by the following detailed description. Exemplary SIM based M2M client systems, methods, and apparatuses will now be described in reference to the accompanying drawings.

Figure 1:
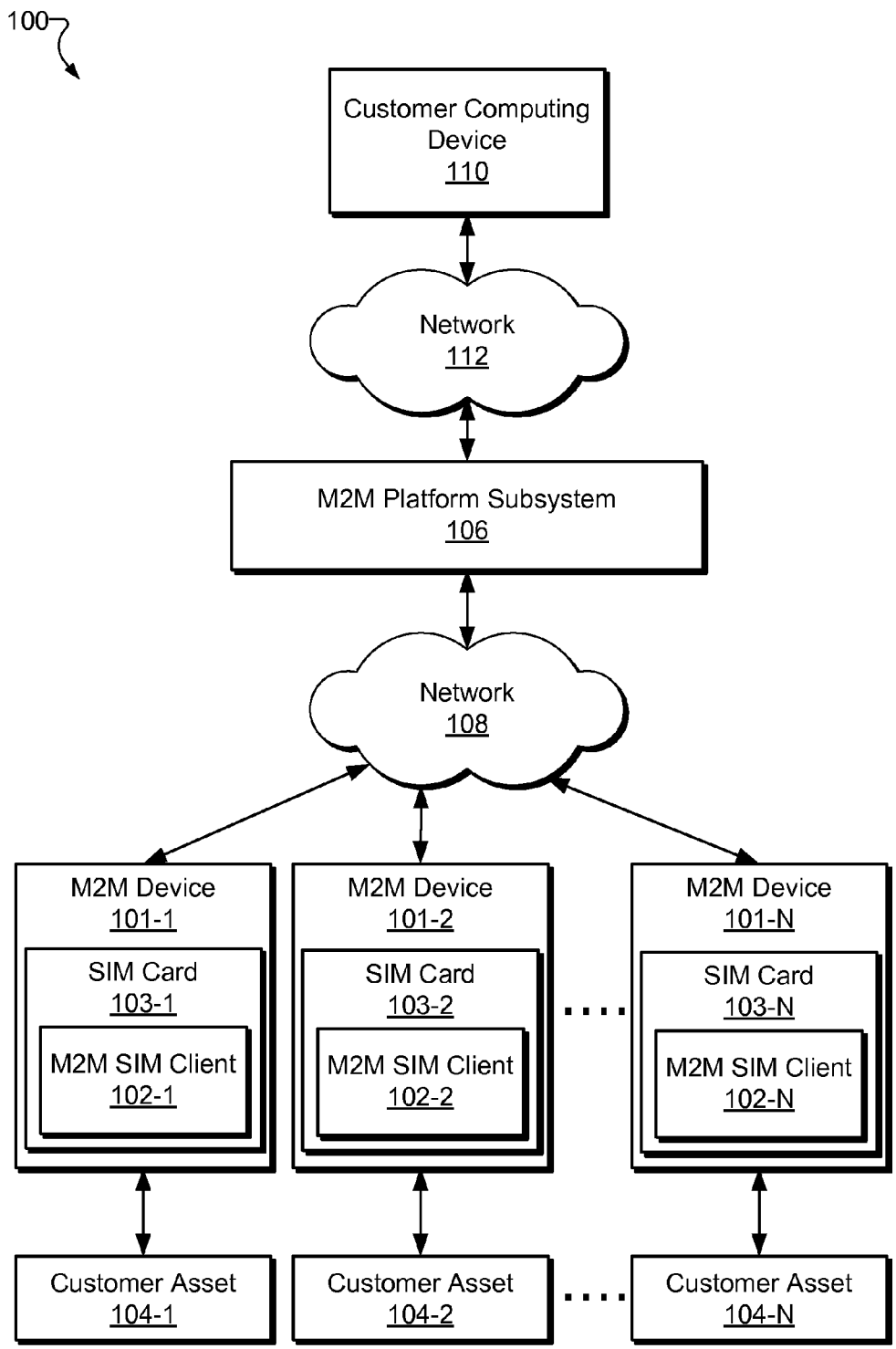
FIG. 1 illustrates an exemplary M2M system according to principles disclosed herein.

FIG. 1 illustrates an exemplary M2M system 100 ("system 100"), which may be configured to provide an M2M solution to a customer of an M2M solutions provider. As shown, system 100 may include M2M devices 101 (e.g., M2M devices 101-1 through 101-N) implementing M2M SIM clients 102 (e.g., M2M SIM clients 102-1 through 102-N) on SIM cards 103 (e.g., SIM cards 103-1 through 103-N) installed in the M2M devices 101. M2M SIM clients 102 may be configured to provide an interface between field-deployed customer assets 104 (e.g., customer assets 104-1 through 104-N) and an M2M platform provided by an M2M platform subsystem 106.

M2M SIM clients 102 may be configured to provide an interface to customer assets 104. Customer assets 104 may include any devices, machines, apparatuses, computing devices, sensors, device-side client computing code (e.g., applications) implemented by a computing device, and/or other assets associated with a customer of an M2M solutions provider. In certain examples, customer assets 104 may include deployed field devices (e.g., parking meters, vending machines, digital billboards, utility meters, vehicles, etc.). Customer assets 104 may be separate from M2M devices 101 or integrated within M2M devices 101.

While FIG. 1 shows each M2M device 101 communicatively coupled to one of the customer assets 104, this is illustrative only and not limiting. An M2M device 101 may be communicatively coupled to one or more customer assets 104, such as in implementations in which an M2M device 101 functions as an M2M gateway device for multiple customer assets 104. Examples of interfaces between an M2M SIM client 102 and device-side customer assets 104 such as a device-side client are described herein.

M2M SIM clients 102 may also provide an interface to M2M platform subsystem 106, such as by sending and receiving communications to and from M2M platform subsystem 106 in accordance with one or more defined M2M platform communications protocols (e.g., one or more over-the-air M2M transport and/or application protocols). For example, M2M SIM clients 102 may send data representative of one or more parameters of customer assets 104 to M2M platform subsystem 106, receive customer asset control messages and/or M2M SIM client 102 management messages from M2M platform subsystem 106, and/or send or receive any other data or communication signals to or from M2M platform subsystem 106.

Through M2M SIM clients 102, M2M devices 101 and M2M platform subsystem 106 may communicate one with another using any communications technologies that are suitable for an M2M solution and/or platform. In certain examples, M2M devices 101 may communicate with M2M platform subsystem 106 by way of a network 108. Network 108 may include one or more wide area wireless networks, (e.g., 3G, 4G, and/or long term evolution ("LTE") networks), carrier-specific networks, and/or any other networks or combination of networks capable of carrying data and communications signals between M2M platform subsystem 106 and M2M devices 101. In certain examples, the provider of the M2M platform and/or solution may operate or otherwise manage network 108.

In certain examples, through M2M SIM clients 102, M2M devices 101 may communicate with M2M platform subsystem 106 by way of a predefined M2M application protocol. The M2M application protocol may provide for any messaging that supports M2M communications for an M2M solution. This may include messages for adding, deleting, requesting, and transferring any data related to an M2M solution.

In certain examples, through M2M SIM clients 102, M2M devices 101 may communicate with M2M platform subsystem 106 by way of a predefined M2M transport protocol that provides communication channels between M2M devices 101 and M2M platform subsystem 106. M2M application protocol messages may be wrapped in the M2M transport protocol. The M2M transport protocol may include a command and acknowledgement protocol (e.g., to provide reliability), support for message caching when an M2M SIM client is not connected to M2M platform subsystem 106, two-way messaging, synchronous messaging, asynchronous messaging, and support for various M2M device architectures (e.g., by using binary or ASCII payloads). M2M transport protocol messages may be wrapped in TCP/IP messages in certain examples.

In some implementations, all messages between M2M devices 101 and M2M platform subsystem 106 are transmitted using the M2M application and/or transport protocols, except for certain device wakeup messages, which may be transmitted using other communication technologies such as TCP/IP or short message service ("SMS") technologies. In other implementations, one or more other messages (e.g., messages other than wakeup messages) may be transmitted using other communication technologies such as TCP/IP or SMS technologies.

M2M platform subsystem 106 may be implemented by one or more servers associated with (e.g., managed or otherwise operated by) an M2M solution and/or platform provider. In certain examples, an operator of network 108 may also operate M2M platform subsystem 106. The one or more servers may be located in a single data center, distributed across a plurality of data centers (e.g., disparately located data centers), and/or otherwise configured as may serve a particular implementation. M2M platform subsystem 106 may be configured to execute or otherwise provide an M2M platform and/or one or more M2M platform services (e.g., M2M wireless network services, M2M application services, M2M device performance services, and/or other server-side functions) of an M2M platform.

M2M platform subsystem 106 may be configured to communicate with a customer computing device 110. Customer computing device 110 may include any suitable computing device (e.g., a server, personal computer, mobile computing device, etc.) associated with (e.g., operated by) a customer of an M2M solutions provider and configured to communicate with M2M platform subsystem 106. Customer computing device 110 may be configured to execute one or more applications configured to interact with the M2M solution. The applications may be developed by the M2M solutions provider, the customer, a system integrator commissioned by the M2M solutions provider and/or the customer, a third party, or any combination thereof.

The applications running on customer computing device 110 may allow a customer to interact with an M2M solution provided by system 100. For example, the applications may receive M2M data from M2M platform subsystem 106 and use the data to generate one or more customer user interfaces through which the customer may access the data, which may allow the customer to analyze customer assets 104 and/or the M2M solution. As another example, the applications may receive user input from the customer, and customer computing device 110 may send communications to M2M platform subsystem 160 based on the user input. For instance, customer computing device 110 may send a control command to M2M platform subsystem 106, which may receive and process the command to facilitate performance of one or more in-field operations of an M2M SIM client 102, M2M device 101, and/or customer asset 104.

In this or a similar manner, an M2M solution provided by system 100 may allow a customer to monitor information about customer assets 104, the information having been received and transmitted by M2M devices 101 to M2M platform subsystem 106 and from M2M platform subsystem 106 to customer computing device 110. Additionally or alternatively, the M2M solution provided by system 100 may allow a customer to control customer assets 104 by way of control commands received by customer computing device 110, forwarded to M2M platform subsystem 106 by customer computing device 110, and sent from M2M platform subsystem 106 to one or more M2M devices 101.

M2M platform subsystem 106 and customer computing device 110 may communicate one with another using any communications technologies that are suitable for an M2M solution and/or platform. In certain examples, M2M platform subsystem 106 may communicate with customer computing device 110 by way of a network 112. Network 112 may include one or more wireless networks (e.g., 3G, 4G, or long term evolution ("LTE") networks), carrier-specific networks, broadband networks, closed media networks, cable networks, satellite networks, the Internet, intranets, wide area networks, local area networks, public networks, private networks, optical fiber networks, and/or any other networks or combination of networks capable of carrying data and communications signals between M2M platform subsystem 106 and customer computing device 110. In certain implementations, networks 108 and 112 may include the same network(s). In other implementations, networks 108 and 112 may include separate networks.

M2M device 101 may include any wireless computing device configured to be deployed in-field and to connect to network 108 when in-field. M2M device 101 may include any hardware, communications facilities (e.g., radio chips, data network communication chips, etc.), sensors (e.g., any configuration of sensors as may suit a particular use case for an M2M solution), firmware, software, and/or other device components. Such components implemented in M2M device 101 on the device side of SIM card 103 and/or M2M SIM client 102 (as opposed to the network 108 side of SIM card 103 and/or M2M SIM client 102) may be referred to as device-side components of M2M device 101.

Figure 2:
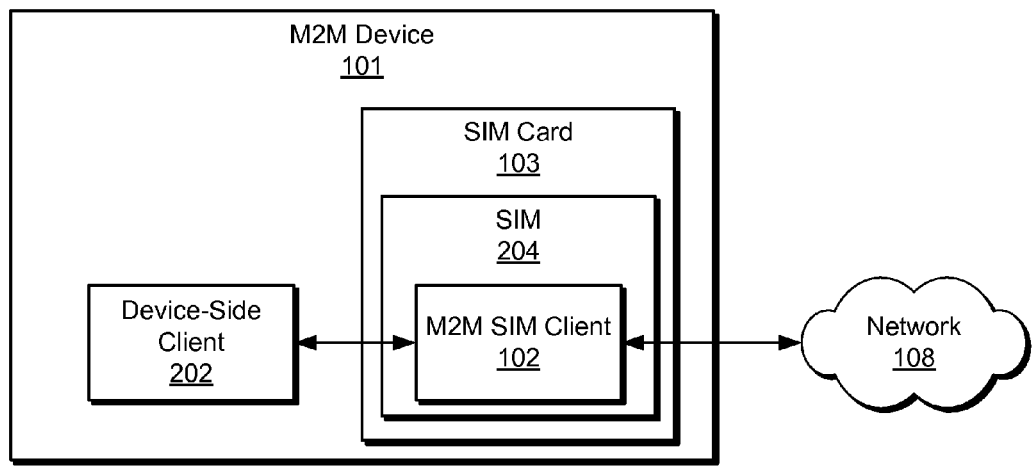
FIG. 2 illustrates an exemplary M2M device according to principles disclosed herein.

FIG. 2 illustrates an M2M device 101 that includes an installed device-side client 202 on the device side of M2M SIM client 102. Device-side client 202 may include any component or components of M2M device 101 implemented on the device side of M2M SIM client 102 and configured to interface with M2M SIM client 102. For example, device-side client 202 may include computing code implemented by M2M device 101 and configured to interact with the M2M SIM client 102 through an interface provided by the M2M SIM client 102. For instance, device-side client 202 may include embedded code and/or an installed software application developed by a customer of the M2M solution, an M2M solutions provider, or a third party such as an OEM that manufactured M2M device 101. In some examples, device-side client 202 may be developed based at least in part on a software development kit ("SDK") provided by an M2M solution and/or platform provider. The SDK may include specifications for use by the developer to develop device-side client 202 to interface with and leverage one or more M2M services provided by M2M SIM client 102.

Device-side client 202 may be configured to perform one or more operations configured to leverage the M2M SIM client 102 and/or M2M platform subsystem 106 to access one or more M2M services. For example, device-side client 202 may be configured to collect parameter data from one or more sensors, which sensors may be components of M2M device 101 and/or customer assets 104. Device-side client 202 may be further configured to provide the collected data to M2M SIM client 102 for reporting to M2M platform subsystem 106 (e.g., as part of a call to a function provided by M2M SIM client 102). As another example, device-side client 202 may be configured to control operations of one or more components of M2M device 101 and/or customer assets 104 based on control commands received from the M2M SIM client 102. Additional and/or alternative examples of M2M services that may be provided by M2M SIM client 102 for use by M2M device 101 (e.g., device-side client 202) are described herein.

As further shown in FIG. 2, M2M device 101 may have a SIM card 103 installed therein. SIM card 103 may be installed in M2M device 101 in any suitable way, such as by inserting SIM card 103 into a SIM card slot of M2M device 101 to establish an electrical connection between SIM card 103 and M2M device 101. SIM card 103 may be made of any suitable materials and may have any suitable form factor (e.g., full, mini, micro, and/or nano SIM card form factors). SIM card 103 may house one or more computing components, such as a processor (e.g., a microprocessor, a microcontroller, etc.), memory (e.g., ROM, RAM, EEPROM, etc.), circuitry, operating system, etc.

A SIM 204 may be implemented in any suitable way on SIM card 103 (e.g., as an integrated circuit on SIM card 103). SIM 204 may store data for use by M2M device 101. For example, SIM 204 may store, without limitation, a unique identifier for the SIM 204 (e.g., a unique serial number such as an integrated circuit card identifier ("IC-CID")), a unique subscriber identifier (e.g., an international mobile subscriber identity ("IMSI")), account information for a subscriber, authentication codes (e.g., keys), network-specific data for a wireless network (e.g., network 108), and a list of services that a subscriber has permission to access over a wireless network. SIM 204 may be configured to encrypt outgoing transmissions (e.g., from M2M device 101) and/or decrypt incoming transmissions (e.g., from M2M platform subsystem 106). Accordingly, SIM 204 may provide M2M device 101 with an identity on network 108, authenticate the M2M device 101 to network 108, and allow the M2M device 101 to communicate over network 108.

SIM 204 may be programmable. For example, computing code (e.g., applications) may be loaded on and configured to be executed by SIM 204. As shown in FIG. 2, M2M SIM client 102 may be implemented on SIM 204. M2M SIM client 102 may be implemented on SIM 204 in any suitable way. For example, M2M SIM client 102 may be an application, such as a thin-client application, loaded on and configured to be executed by SIM 204.

While FIG. 2 shows M2M SIM client 102 implemented as part of SIM 204, this is illustrative only. In other examples, M2M SIM client 102 may be installed on SIM card 103 in other ways, such as computing hardware and/or code installed on SIM card 103 separate from SIM 204.

M2M SIM client 102 may be configured to perform one or more operations of the M2M SIM client 102 described herein (e.g., by directing a processor on the SIM card 103 to perform the operations). Such operations may include M2M SIM client 102 providing an interface to M2M platform subsystem 106 through which M2M device 101 communicates with M2M platform subsystem 106 by way of network 108, providing a device-side interface through which M2M device 101 (e.g., one or more device-side components such as device-side client 202 installed on M2M device 101) interfaces with M2M SIM client 102, and providing one or more M2M services to M2M device 101 (e.g., to device-side client 202 and/or one or more other device-side components of M2M device 101).

Figure 3:
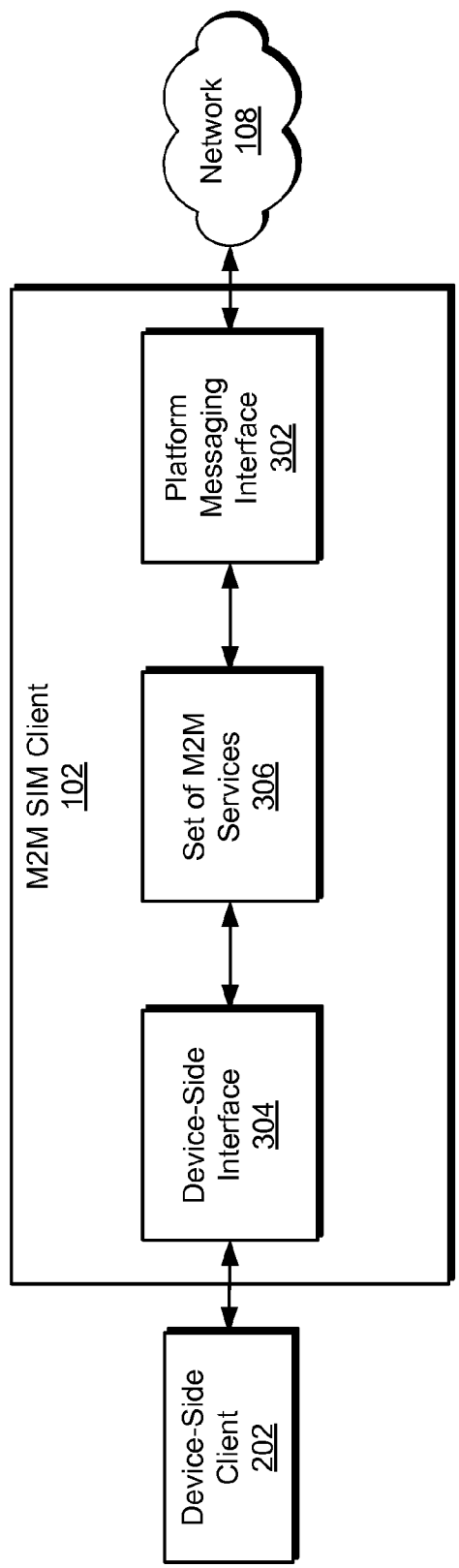
FIG. 3 illustrates an exemplary M2M subscriber identification module ("SIM") client according to principles disclosed herein.

FIG. 3 illustrates M2M SIM client 102 providing a platform messaging interface 302 for interfacing with M2M platform subsystem 106 by way of network 108 and a device-side interface 304 for interfacing with device-side client 202. M2M SIM client 102 may also provide a set of M2M services 306, which may include any functionality related to an M2M solution and/or platform that may be performed by M2M SIM client 102. The inclusion of such functionality on M2M SIM client 102 may help standardize and/or simplify development of M2M devices 101 and/or device-side clients 202 across various vertical M2M solutions and/or use cases, which may help to reduce or otherwise control costs and/or complexities of providing an M2M platform and/or M2M solutions. The elements of M2M SIM client 102 illustrated in FIG. 3 will now be described in more detail.

Platform messaging interface 302 may include any interface suitable to support wireless communications with M2M platform subsystem 106 by way of network 108. For example, the interface may facilitate communications with M2M platform subsystem 106 using one or more M2M platform communications protocols (e.g., one or more over-the-air M2M transport and/or application protocols). The interface may allow M2M SIM client 102, M2M device 101, and/or one or more components of M2M SIM client 102 or M2M device 101 to communicate with M2M platform subsystem 106 with such protocols. Through such communications, one or more platform services provided by M2M platform subsystem 106 may be accessed by M2M device 101 or any component of M2M device 101 (e.g., M2M SIM client 102 and/or device-side client 202). For example, M2M SIM client 102 may provide messages to and receive messages from M2M platform subsystem 106 by way of platform messaging interface 302, which messages may facilitate access by M2M device 101 to one or more M2M platform services.

Device-side interface 304 may include any interface suitable to support communications between M2M SIM client 102 and one or more device-side components of M2M device 101, such as device-side client 202. As an example, the interface may include a set of application program interfaces ("APIs") exposed by M2M SIM client 102 for use by device-side client 202 to interact with M2M SIM client 102. Such an API may include a set of one or more calls (e.g., function calls and callbacks) that may be called by device-side client 202 and/or used by M2M SIM client 102 to provide notifications to device-side client 202. As another example, the interface may include any suitable technologies for use by M2M device 101 to interface with a SIM on a SIM card (e.g., SIM 204 on SIM card 103), including any such industry-standard technologies. As another example, the interface may define a set of AT commands that may be used by device-side client 202 for interaction with M2M SIM client 102. The interface may support asynchronous and/or synchronous messaging. A specification defining the interface may be provided to a customer, OEM, or other entity for use in developing M2M device 101, device-side client 202, or other component of M2M device 101 to interact with M2M SIM client 102.

The set of M2M services 306 may include one or more M2M services that may be provided to M2M device 101 by M2M SIM client 102. The M2M services 306 may include one or more M2M device services that may be provided to M2M device 101 (e.g., to device-side client 202) by M2M SIM client 102 independently of M2M platform subsystem 106 (e.g., without communicating with the M2M platform subsystem 106 in conjunction with providing the M2M device services). Additionally or alternatively, the M2M services 306 may include one or more M2M platform services provided to M2M device 101 (e.g., to device-side client 202) by M2M platform subsystem 106 through M2M SIM client 102. For such M2M platform services, M2M SIM client 102 may communicate with M2M platform subsystem 106 in conjunction with providing the M2M platform services.

Examples of M2M services 306 that may be provided by M2M SIM client 102 will now be described. The examples are illustrative only. Additional or alternative M2M services 306 may be provided by M2M SIM client 102 in other examples.

The set of M2M services 306 may include a device discovery service. The device discovery service may include M2M SIM client 102 performing a discovery process to discover M2M device 101 to M2M platform subsystem 106. The discovery process may include any operations helpful for M2M device 101 to be discovered by M2M platform subsystem 106.

The set of M2M services 306 may include a capabilities report service. The capabilities report service may include M2M SIM client 102 reporting a set of capabilities of M2M device 101 to M2M platform subsystem 106. In certain examples, this may include M2M SIM client 102 reporting the set of one or more M2M services 306 supported by M2M SIM client 102 on M2M device 101. In certain examples, the reporting may be performed by M2M SIM client 102 in conjunction with (e.g., during) performance of the discovery process described above.

The set of M2M services 306 may include one or more configuration services. A configuration service may include M2M SIM client 102 performing a configuration process to configure M2M device 101. As an example, M2M SIM client 102 may perform a configuration process to configure one or more sensors associated with M2M device 101. The sensor configuration may specify what sensors and/or controls are connected to M2M device 101, schedules for taking sensor readings and/or sending sensor readings to M2M platform subsystem 106, thresholds to check, events to detect based on the thresholds, how sensors are interfaced with M2M SIM client 102 (e.g., by configuring sensor port addresses), and/or any other settings of sensors connected to M2M device 101.

As another example, M2M SIM client 102 may perform a configuration process to configure any other settings and/or operations of M2M device 101 and/or M2M SIM client 102. For example, the configuration process may configure memory limits for data queues, retry intervals and counts for connection setup, intervals for checking for a new device configuration, logging behavior and attributes, connection manager behavior (e.g., always on, linger timer, etc.), network usage randomization, and/or any other settings or operations of M2M device 101 and/or M2M SIM client 102.

The set of M2M services 306 may include a device wakeup service. The device wakeup service may include M2M SIM client 102 receiving a device wakeup message from M2M platform subsystem 106 and forwarding the device wakeup message to M2M device 101 to initiate a wakeup process to wake up M2M device 101. M2M device 101 (e.g., device-side client 202) may respond by performing one or more operations to wake up M2M device 101 (e.g., from a low-power or sleep mode) and connect to network 108.

In certain examples, in conjunction with the device wakeup process, M2M SIM client 102 may check that the configuration of M2M device 101 is current. If the configuration is not current, M2M SIM client 102 may perform a configuration process to update the configuration of M2M device 101. In certain examples, in conjunction with the device wakeup process, M2M SIM client 102 may pick up any queued messages, such as control messages from M2M platform subsystem 106.

The set of M2M services 306 may include a data connection service. The data connection service may include M2M SIM client 102 facilitating an establishment of a data connection between M2M device 101 and M2M platform subsystem 106 by way of network 108. The data connection may be established by M2M device 101 in any suitable way and may be in any suitable form, including any of those described herein.

The set of M2M services 306 may include a data delivery service. The data delivery service may include M2M SIM client 102 obtaining sensor reading data from one or more sensors of M2M device 101 and delivering the sensor reading data to M2M platform subsystem 106 by way of network 108.

The set of M2M services 306 may include one or more additional or alternative data delivery or reporting services. For example, a diagnostics service may include M2M SIM client 102 obtaining performance data, analytics data, status data, and/or other data associated with M2M device 101 and delivering the data to M2M platform subsystem 106 by way of network 108. For instance, M2M SIM client 102 may collect and report diagnostic information regarding radio frequency ("RF") performance of M2M device 101 and/or the view of network 108 from M2M device 101. M2M SIM client 102 may be configured to report such data in accordance with a predefined schedule, in response to an occurrence of a predefined event, and/or on-demand.

The set of M2M services 306 may include a device control service. The device control service may include M2M SIM client 102 receiving a device control command from M2M platform subsystem 106 and forwarding the device control command to M2M device 101. For example, M2M SIM client 102 may forward the device control command to device-side client 202, which may receive the device control command and perform one or more device-side operations in response to the device control command. The device control command may be configured to initiate performance of any suitable device-side operations. For example, the device control command may include a request to build and send a diagnostic message, update the preferred roaming list ("PRL") of M2M device 101, send sensor readings, terminate an active connection to M2M platform subsystem 106, obtain a device log, obtain error messages, reboot M2M device 101, restart M2M device 101, and/or any other operations.

The set of M2M services 306 may include a software update service. The software update service may include M2M SIM client 102 receiving a software update from M2M platform subsystem 106 and performing the software update to update software installed on M2M device 101. For example, the software update may apply an update to M2M SIM client 102 or device-side client 202 installed on M2M device 101. In certain examples, the software update may be performed on-the-fly without interrupting certain operations of M2M device 101. In certain examples, M2M SIM client 102 may perform a software update process in conjunction with (e.g., during) performance of the discovery process described above. In certain examples, a software update service may include M2M SIM client 102 monitoring for outdated software installed on M2M device 101 and initiating performance of the software update process in response to a detection of outdated software installed on M2M device 101.

The set of M2M services 306 may include a device provisioning service. The device provisioning service may include M2M SIM client 102 automatically initiating an over-the-air service provisioning process in response to a first-time power-up of M2M device 101. Performance of the provisioning process may provision M2M device 101 with a mobile directory number ("MDN"), a PRL, and other information useful for M2M device 101 to operate on network 108. After M2M device 101 is provisioned, M2M SIM client 102 may receive a device control command from M2M platform subsystem 106 that includes a request to update the provisioned information (e.g., the PRL) on M2M device 101.

In certain examples, M2M SIM client 102 may have a modular configuration. For example, M2M SIM client 102 may include a set of modules configured to provide a set of M2M services 306. Accordingly, a particular set of M2M services 306 may be provided by M2M SIM client 102 based on a particular set of modules implemented in M2M SIM client 102. This may allow M2M SIM client 102 to be conveniently configured and/or reconfigured to fit the capabilities of M2M device 101 and/or features of an M2M solution. The set of modules may be provided as an M2M SIM client framework implemented on the M2M SIM client 102.

Figure 4:
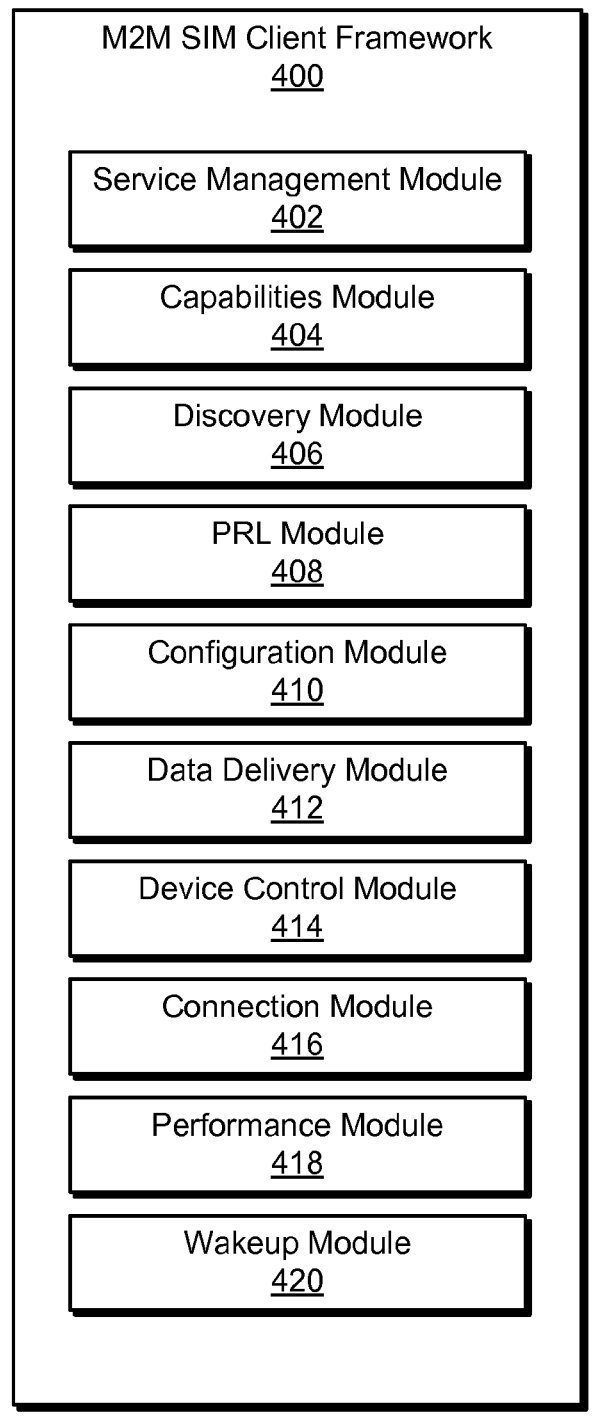
FIG. 4 illustrates an exemplary M2M SIM client module framework according to principles disclosed herein.

FIG. 4 illustrates an exemplary M2M SIM client framework ("SCF") 400. As shown, SCF 400 may include a set of SCF service modules that includes a service management module 402, a capabilities module 404, a discovery module 406, a PRL module 408, a configuration module 410, a data delivery module 412, a device control module 414, a connection module 416, a performance module 418, and a wakeup module 420. Any of the SCF service modules may communicate one with another in any suitable way.

The particular set of SCF service modules shown in FIG. 4 is illustrative only. Other implementations may include alternative sets of SCF service modules. For example, one or more of the SCF service modules shown in FIG. 4 may be omitted from other implementations.

Each of the SCF service modules may be configured to perform one or more M2M SIM client 102 operations, which operations may provide M2M device 101 (e.g., device-side client 202) access to one or more M2M services. Accordingly, the SCF service modules may also be referred to as M2M service enablers.

Service management module 402 may be configured to control (e.g., start and stop) an overall service provided by SCF 400. In certain examples, the overall service may be started and operating in order for any other operations of SCF 400 to be accessed and/or provided. To this end, service management module 402 may be configured to start and stop other SCF service modules to enable and disable corresponding M2M services.

Service management module 402 may be configured to perform one or more operations to roll back from SCF 400 operating in the application mode to operating in a discovery mode. The rollback may include service management module 402 notifying device-side client 202 that a rollback has been requested. In accordance with SCF specifications, device-side client 202 may be configured to respond to the notification by issuing a call to service management module 402 to stop the overall service, waiting for the service to be stopped by service management module 402, issuing a call to service management module 402 to start the overall service, and waiting for the service to be started by service management module 402. In some examples, device-side client 202 may then request a discovery process provided by M2M SIM client 102 to facilitate a discovery of M2M device 101 by M2M platform subsystem 106. In other examples, service management module 402 may exit the application mode and automatically initiate execution of a discovery process after exiting the application mode.

In certain examples, service management module 402 may perform one or more operations to restart SCF 400. This may include service management module 402 notifying device-side client 202 that a restart has been requested or is needed, stopping the overall service provided by SCF 400, and restarting the overall service provided by SCF 400. In accordance with SCF specifications, device-side client 202 may be configured to respond to the notification by issuing a call to service management module 402 to stop the overall service, performing any cleanup, waiting for the service to be stopped by service management module 402, issuing a call to service management module 402 to start the overall service, and waiting for the service to be started by service management module 402.

In certain examples, service management module 402 may perform one or more operations to facilitate a reboot of M2M device 101. This may include notifying device-side client 202 that a device reboot has been requested or is needed, and stopping the overall service provided by SCF 400. In accordance with SCF specifications, device-side client 202 may be configured to respond to the notification by issuing a call to service management module 402 to stop the overall service, performing any cleanup, and initiating a device reboot (e.g., using OEM-specific APIs).

M2M device 101 may be configured to provide interfaces through which service management module 402 may request and receive a device identifier (e.g., an electronic serial number ("ESN"), mobile equipment identifier ("MEID"), international mobile equipment identifier ("IMEI"), or other device identifier) and other device information such as a device manufacturer, model, operating system, operating system version, and machine or hardware type.

Capabilities module 404 may be configured to get and report device capabilities, which may include features supported by M2M device 101 (e.g., features provided and/or supported by device-side client 202). A set of capabilities for M2M device 101 may be defined by an M2M solution provider, an M2M platform provider, a customer of an M2M solution and/or platform provider, an OEM of M2M device 101, another entity, or any combination thereof. In certain examples, the set of capabilities may include standard capabilities (e.g., capabilities defined by the particular service modules implemented by SCF 400) and optional custom capabilities (e.g., custom capabilities defined by an M2M solution provider, a customer of the M2M solution provider, and/or a device OEM). Capabilities module 404 may get information about the capabilities from any suitable source, such as from service management module 402 and/or from components of M2M device 101.

Capabilities module 404 may also be configured to set device capabilities, which may include defining data that represents the set of capabilities of M2M device 101. In certain examples, capabilities module 404 may be configured to set the custom capabilities of M2M device 101. The capabilities may be represented in any suitable way, such as with key value pairs ("KVPs").

Examples of standard capabilities of M2M device 101 may include, without limitation, a type of device, a device version, a compression type supported by the device, types of wakeup messages supported by the device (e.g., Internet Protocol ("IP") wakeup messages and/or Short Messaging Service ("SMS") wakeup messages), an ability to kill a data connection for a specified length of time, types of configuration objects supported by the device (e.g., KVP, data elements, schedules, schedule groups, threshold structures, plug-in interface definitions, and plug-in binaries), an ability to support a PRL update device control request, a type or reboot and/or reset message supported by the device, support for a diagnostics message, support for device performance diagnostics events, and support for data delivery by M2M device 101. Examples of custom capabilities of M2M device 101 may include, without limitation, a valve control capability (e.g., indicating that device-side client 202 can open and close a customer asset valve), a thermostat control (e.g., indicating that device-side client 202 can set a customer asset thermostat), an ignition cutoff control (e.g., indicating that device-side client 202 can disable an ignition of a customer asset such as a vehicle), a communication capability of M2M device 101 (e.g., wireless or wireline communication capabilities such as an 802.11 router or card, Wi-Fi capabilities, protocols such as Zigbee, Zeewave, near-field communications ("NFC"), Bluetooth, Power Line Communication ("PLC"), iBeacon, etc.), and a payment collection capability of an M2M device (e.g., an attached payment device).

Discovery module 406 may be configured to perform a discovery process to facilitate a discovery of M2M device 101 by M2M platform subsystem 106. The discovery process may include discovery module 406 reporting the capabilities of and/or M2M services supported by M2M device 101 to M2M platform subsystem 106. The discovery process may also include discovery module 406 communicating with M2M platform subsystem 106 to provision M2M device 101 with a unique identifier ("unique ID"). Discovery module 406 may acquire the unique ID from M2M platform subsystem 106. The discovery process may also include discovery module 406 communicating with M2M platform subsystem 106 to provision M2M device 101 with a customer identifier ("customer ID") that may be used to identify the customer associated with M2M device 101. In some examples, the discovery process may include or be followed by delivery of computing code (e.g., software) to M2M device 101. The computing code may be delivered to M2M device 101 in any suitable way and/or format. For example, the computing code may include a computing code implementation of SCF 400, an operating system image that an OEM may package with SCF 400, or device-side client 202 or other application client configured to interface with SCF 400. Such delivery of computing code may require validation of M2M device 101.

Before discovery module 406 completes the discovery process, M2M device 101 may operate in discovery mode. During operation in the discovery mode, a modem identifier (e.g., an ESN, a MEID, etc.) may be used to identify M2M device 101 to M2M platform subsystem 106, and all messages may be routed to a discovery platform service provided by M2M platform subsystem 106.

After M2M device 101 completes the discovery process and acquires and starts using a unique ID as described above, the M2M device 101 operates in an application mode. During operation in the application mode, the unique ID may be used to identify M2M device 101 to M2M platform subsystem 106. This may enable M2M device 101 to communicate with and leverage other M2M platform services (i.e., services other than the discovery service) provided by M2M platform subsystem 106.

Discovery module 406 may also be configured to get and report a discovery status, which may include discovery module 406 determining one or more parameters of discovery module 406 and generating and providing an indication of the discovery status of M2M device 101 based on the parameters.

PRL module 408 may be configured to perform an activation process to activate an M2M device such as M2M device 101 to access network 108 and establish a data connection with M2M platform subsystem 106. The activation process may provide M2M device 101 with an MDN, a PRL, and/or other information. In alternative implementations, activation of the M2M device may be omitted from PRL module 408 and performed automatically by SCF 400 (e.g., on power-up of the M2M device). The PRL may control network selection (e.g., cellular tower selection) by M2M device 101.

PRL module 408 may be configured to update the PRL of M2M device 101. The update may be performed in any suitable way, such as by PRL module 408 initiating a voice call to network 108. The update may be performed periodically and/or in response to a predetermined event (e.g., in response to a request from M2M platform subsystem 106) and may update the PRL to reflect changes to network 108 (e.g., changes to cellular towers) and/or roaming agreements.

M2M device 101 may be configured to provide one or more interfaces through which PRL module 408 may get an activation status for the device, activate the device, perform a PRL update, and/or retrieve current PRL information (e.g., PRL version).

Configuration module 410 may be configured to perform a configuration process to configure M2M device 101. After M2M device 101 is discovered as described above, configuration module 410 may download data representative of a device configuration (e.g., a sensor configuration) from M2M platform subsystem 106 (e.g., from a configuration platform service provided by M2M platform subsystem 106). The device configuration may include information configured to be used by device-side client 202 to determine what operations to perform and when to perform the operations. For example, the device configuration may specify what customer assets to monitor, when to take readings of customer assets, when to send the readings to M2M platform subsystem 106, how to identify an occurrence of a predefined exceptional event, and/or what operations to perform in response to the occurrence of the predefined exceptional event.

In certain examples, a device configuration may include configuration elements such as KVPs, data elements, schedules, schedule groups, threshold structures, plug-ins, or any combination or sub-combination thereof. Each of these items will now be described.

KVPs may include standard KVPs that may be used to control behavior of M2M device 101 and/or customer-defined KVPs that may be used as may suit device-side client 202. For example, standard KVPs may be defined to enable or disable an "always on" parameter associated with connection module 416 and/or to set a linger time parameter used by connection module 416 as described herein. Customer-defined KVPs may be defined to set parameters used by customer assets 104, such as to set a rate schedule for connected wireless parking meters, to set an internal parameter of device-side client 202, and/or as may otherwise suit a customer.

Examples of standard KVPs include, without limitation, an M2M transport protocol host name lookup interval for an M2M transport protocol server IP address, a retry interval specifying how long to wait between message transmission retries (e.g., a retry may be attempted if an acknowledgement message is not received after the retry interval), a retry count specifying a number of retry attempts to perform at the specified retry interval, a configuration check interval specifying a length of time between configuration checks, a data connection parameter (e.g., an "always on" parameter), a data connection linger time specifying a length of time that a data connection with M2M platform subsystem 106 remains connected after the last data transmission on the data connection, a device configuration identifier (e.g., a name of a configuration file), a device configuration version identifier, a size of a queue (e.g., number of items) to be used for readings, events, and errors, a size of a device performance service event queue (e.g., number of items), and a time interval between sending of device performance service events to M2M platform subsystem 106.

Data elements may define internal and/or external inputs and/or outputs to be monitored and/or controlled. Data elements may also define how and when to perform sensor readings and/or writings. A data element may be used to hold a value from a sensor reading and/or a value to be used to write a control parameter (e.g., to a sensor or other customer asset 104).

Schedules may specify when operations are to be performed. A fixed point type schedule may define a point in time when operations are to be performed. A window type schedule may define a window of time within which operations may be performed one or more times. Schedules may be activated and deactivated. In certain examples, schedules may specify how often readings are to be collected from customer assets 104 and/or how often to send the readings to M2M platform subsystem 106.

Schedule groups may contain lists of schedules organized to define a more complex scheduling scenario than would be possible with individual schedules alone. A schedule group may be activated when a schedule included within the schedule group is activated. Schedule groups may be accessed by one or more data elements.

Threshold structures may define criteria for exception events and data to be returned or actions to be taken when exceptional events occur. Threshold structures may be accessed by one or more data elements. When a value of a data element that references a threshold structure satisfies the criteria defined by the threshold structure, an event message may be generated and sent to M2M platform subsystem 106. Accumulated readings data may also be sent to M2M platform subsystem 106 in conjunction with the event message (e.g., immediately following the event message). For example, when an event occurs, one or more schedule groups may be triggered to cause readings to be collected that represent the current state of M2M device 101. Further, when a value of the data element that references a threshold structure satisfies the criteria defined by the threshold structure, an action may be taken. For example, a valve may be opened, an HVAC system may be turned off, an ignition cut-off may be enabled, or another action may be taken.

Plug-ins may include binary executables that may be downloaded to M2M device 101 as part of a configuration. Plug-ins may provide capabilities to interface with input and/or output protocols not otherwise supported by the M2M device 101. Plug-ins may also be used to extend the functionality of device-side client 202 or to solve application-specific problems. For example, a plug-in may be downloaded to M2M device 101 that is configured to adapt M2M device 101 to an applicable scenario and/or input/output device, or to upgrade device-side client 202. In some examples, download of a plug-in to M2M device 101 does not require validation of M2M device 101.

Configuration module 410 may be configured to modify a sensor configuration of M2M device 101 at any time by performing a configuration process (e.g., a configuration update). In addition, configuration module 410 may be configured to check the current sensor configuration of M2M device 101 by sending a configuration check message to M2M platform subsystem 106. The configuration check message may include a cyclic redundancy check ("CRC") value for each component of the sensor configuration. M2M platform subsystem 106 may check these values against information maintained by M2M platform subsystem 106. If any of the values do not match the information maintained by M2M platform subsystem 106, M2M platform subsystem 106 may determine that the associated components of the sensor configuration at M2M device 101 are outdated and may download up-to-date versions of the components of the sensor configuration to M2M device 101.

Data delivery module 412 may be configured to perform one or more operations to allow device-side client 202 to send data representative of readings (e.g., sensor readings), events, and/or errors to M2M platform subsystem 106. Such data may be sent on-demand and/or in accordance with a device configuration (e.g., a readings and/or send schedule defined by the configuration). For example, data delivery module 412 may be configured to operate in a particular data delivery mode that is currently enabled by a device configuration. The data delivery modes may provide various levels of data persistence and/or reporting (e.g., various levels of how long collected data remains stored and/or how often collected data is sent to M2M platform subsystem 106). The data delivery modes may be defined as may suit a particular implementation.

Data delivery module 412 may be configured to provide device-side client 202 with a result of a transmission of data to M2M platform subsystem 106. The result may represent a result of the transmission at an M2M transport protocol messaging layer. This may help to ensure reliability of messaging from M2M device client 102 to M2M platform subsystem 106.

Data delivery module 412 may be configured to save pending messages in a queue to non-volatile memory in accordance with a persistence level of a data delivery mode. This may allow messages to be recovered after a restart of M2M device client 102.

Data delivery module 412 may be configured to queue messages when a connection with M2M platform subsystem 106 is unavailable. The size of the queue (e.g., maximum number of entries) may be defined by a device configuration. When the queue is full, new messages may replace old messages.

Device control module 414 may be configured to receive a device control message from M2M platform subsystem 106 and to send a message to M2M device 101 (e.g., to device-side client 202) to direct the M2M device 101 to perform one or more operations specified by the device control message.

Certain control messages may be independent of a device configuration (e.g., a sensor configuration). Examples of such control messages include, without limitation, an SCF restart message, a device wakeup message, a modem diagnostics message that requests that M2M device 102 build a modem diagnostics message and send it to M2M platform subsystem 106, a PRL update message, a message that requests that M2M device 102 immediately send all queued readings (instead of waiting until the next send schedule), a kill session message that terminates a current connection (e.g., a point-to-point ("PPP") session) and leaves the connection closed for a specified length of time or until an IP or SMS wakeup message is received, a reboot message (e.g., a warm SCF restart or device reboot message in which queued messages are saved on SCF shutdown and recovered on SCF startup and/or a cold SCF restart or device reboot message in which queued messages are discarded on SCF shutdown), a diagnostics or debug request message, a device status message, a PRL update message, and a get error message.

Certain other control messages may be dependent on a device configuration (e.g., a sensor configuration). Such messages may be able to reference the device configuration. For example, such a message may instruct M2M device 101 (e.g., device-side client 202) to send a particular value through a configured register address of a defined data element of the device configuration. Examples of such control messages include, without limitation, a message that requests a current value of a data element and any control message that references a data element of a device configuration. Such control messages may be referred to as "control point" messages. To illustrate examples of control point messages, a control point message may instruct device-side client 202 to open a valve, change a thermostat setting, or otherwise affect a desired change to M2M device 101 and/or customer assets 104.

Connection module 416 may be configured to establish, terminate, and/or otherwise maintain a data connection that has been established between M2M device 101 and M2M platform subsystem 106. The connection may be maintained in accordance with a connection mode. For example, when the connection setting is enabled, the data connection may be maintained as "always on" and remain connected even when no data is sent. When the connection setting is disabled, the data connection may be maintained and remain connected for a predefined length of time ("linger time") after a last data transmission. The connection setting and the linger time may be set by a configuration of M2M device 101. Connection module 416 may be configured to get and report information about a connection (e.g., connection state information) to device-side client 202. M2M device 101 may be configured to provide interfaces through which connection module 416 may open a PPP data connection, close a PPP data connection, and check the status of a PPP data connection.

Performance module 418 may be configured to monitor one or more parameters related to the performance of M2M device 101 (including a modem of M2M device 101). Performance module 418 may be configured to detect a predefined event (e.g., certain network conditions such as PPP connects and disconnects, call ends, registration failures, roaming failures, etc.) and report the event to M2M platform subsystem 106 (e.g., as a message that includes a name value pair ("NVP") string containing parameters and/or attributes useful to a device performance service of M2M platform subsystem 106 to interpret the event). Performance module 418 may define the message in any suitable format, such as a predefined diagnostics data format.

In certain implementations, performance module 418 may be configured to generate and send a diagnostics summary message that contains all of the parameters and/or attributes monitored by performance module 418. In certain examples, the diagnostics summary message may be requested remotely using a device control message sent from M2M platform subsystem 106 to M2M device 101.

Performance module 418 may be configured to send messages for detected events to M2M platform subsystem 106 as soon as the events are detected and a connection is available, in accordance with a send schedule specified by a device configuration, or as instructed by device-side client 202. To this end, performance module 418 may be configured to operate in one of an immediate send mode (in which performance data is sent to M2M platform subsystem 106 as soon as the data is collected and a connection is available), a scheduled send mode (in which performance data is sent to M2M platform subsystem 106 in accordance with a defined send schedule), and a manual send mode (in which performance data is sent to M2M platform subsystem 106 in response to a request from device-side client 202 or M2M platform subsystem 106).

M2M device 101 may be configured to provide interfaces through which performance module 418 may retrieve modem information (e.g., modem received signal strength indication ("RSSI")) and a diagnostic summary message.

Wakeup module 420 may be configured to perform one or more operations related to waking up M2M device 101 in response to a wakeup message from a remote source. For example, wakeup module 420 may receive an IP or SMS wakeup message and respond by directing connection module 416 to establish a connection with M2M platform subsystem 106 and directing configuration module 410 to send a configuration check message to M2M platform subsystem 106. An IP wakeup message may be used when a TCP/IP server socket is maintained on a port and/or when a PPP connection is open. An SMS wakeup message may be useful when such a socket or connection is not available. A wakeup message may include payload defined in any suitable format, which may be used for validating the source of the wakeup request. Wakeup module 420 may maintain a count of wakeup messages received, for each type of wakeup message, beginning when SCF 400 starts (and resetting when SCF 400 restarts).

In certain examples, the set of M2M services 306 provided by M2M SIM client 102 may include only M2M services that are universally usable across different vertical M2M solutions. Such M2M services may be referred to as "horizontal" M2M services. Thus, a set of horizontal M2M services may include any of the exemplary M2M services described herein that are universally usable across different vertical M2M solutions, without having to be custom adapted for different vertical M2M solutions.

In certain other examples, the set of M2M services 306 provided by M2M SIM client 102 may include a set of one or more horizontal M2M services and a set of one or more other M2M services customized to a specific vertical M2M solution. M2M services that are customized to a specific vertical M2M solution may be referred to as "vertical" M2M services. M2M SIM client 102 may be customized to provide any set of vertical M2M services. Examples of vertical M2M services will now be described. The examples are illustrative only. Additional or alternative vertical M2M services may be provided by M2M SIM client 102 in other examples.

The set of vertical M2M services may include a parameter data conversion service. The parameter data conversion service may include M2M SIM client 102 converting parameter data. To illustrate, M2M SIM client 102 may be configured to convert raw sensor reading data to another form of data that may be meaningful to M2M device 101, M2M platform subsystem 106, customer computing device 110, and/or a customer of an M2M solution. As one example, M2M SIM client 102 may convert raw sensor reading data collected from an in-field moisture sensor to a percent ground humidity value that may be transmitted by M2M device 101 to M2M platform subsystem 106 and from M2M platform subsystem 106 to customer computing device 110.

The set of vertical M2M services may include an authentication service. The authentication service may include M2M SIM client 102 authenticating M2M device 101 based on a SIM identifier (e.g., an identifier for SIM 204 implemented on SIM card 103) and a device identifier for M2M device 101. Such an authentication may be referred to as a "hosted authentication" and may provide a certain level of security for an M2M solution. To illustrate, the M2M solution may be provided to a customer such as a medical services company, which wants to ensure that data (e.g., medical data) received from M2M device 101 is from a valid user and device. Hosted authentication may help ensure that a valid M2M device 101 and valid SIM 204 are being used to send such data.

The set of vertical M2M services may include an event detection service. The event detection service may include M2M SIM client 102 obtaining sensor reading data from a set of one or more sensors associated with M2M device 101 and detecting an occurrence of an event based on the sensor readings data and a predefined event detection heuristic. The predefined event detection heuristic may be implemented in M2M SIM client 102 and may specify one or more conditions to be satisfied by sensor readings data to indicate an occurrence of the event. For example, the heuristic may specify a threshold for a sensor reading value that, when satisfied, indicates an occurrence of the event. To illustrate a specific example, for a medical personal emergency response M2M solution, M2M SIM client 102 may detect a medical emergency based on values of blood pressure data, pulse rate data, oxygen concentration level data, and/or other sensor readings data meeting thresholds specified by the heuristic.

In certain examples, M2M device 101 may be configured to function as an M2M gateway device for one or more field-deployed customer assets 104. M2M device 101 may be field deployed together with the customer assets 104 in a configuration in which M2M device 101 is able to communicate with the customer assets 104 (e.g., by receiving data from and/or sending commands to the customer assets 104). Any suitable communication technologies may be used for such communications between M2M gateway device 101 and one or more customer assets 104. As an example, M2M device 101 may function as an M2M gateway for a plurality of field-deployed parking meters.

In such a gateway configuration, M2M SIM client 102 implemented by M2M gateway device 101 may provide M2M services to M2M gateway device 101 and customer assets 104 in any of the ways described herein. For example, M2M SIM client 102 implemented by M2M gateway device 101 may be configured to enable management of the customer assets 104 behind the M2M gateway device 101.

Figure 5:
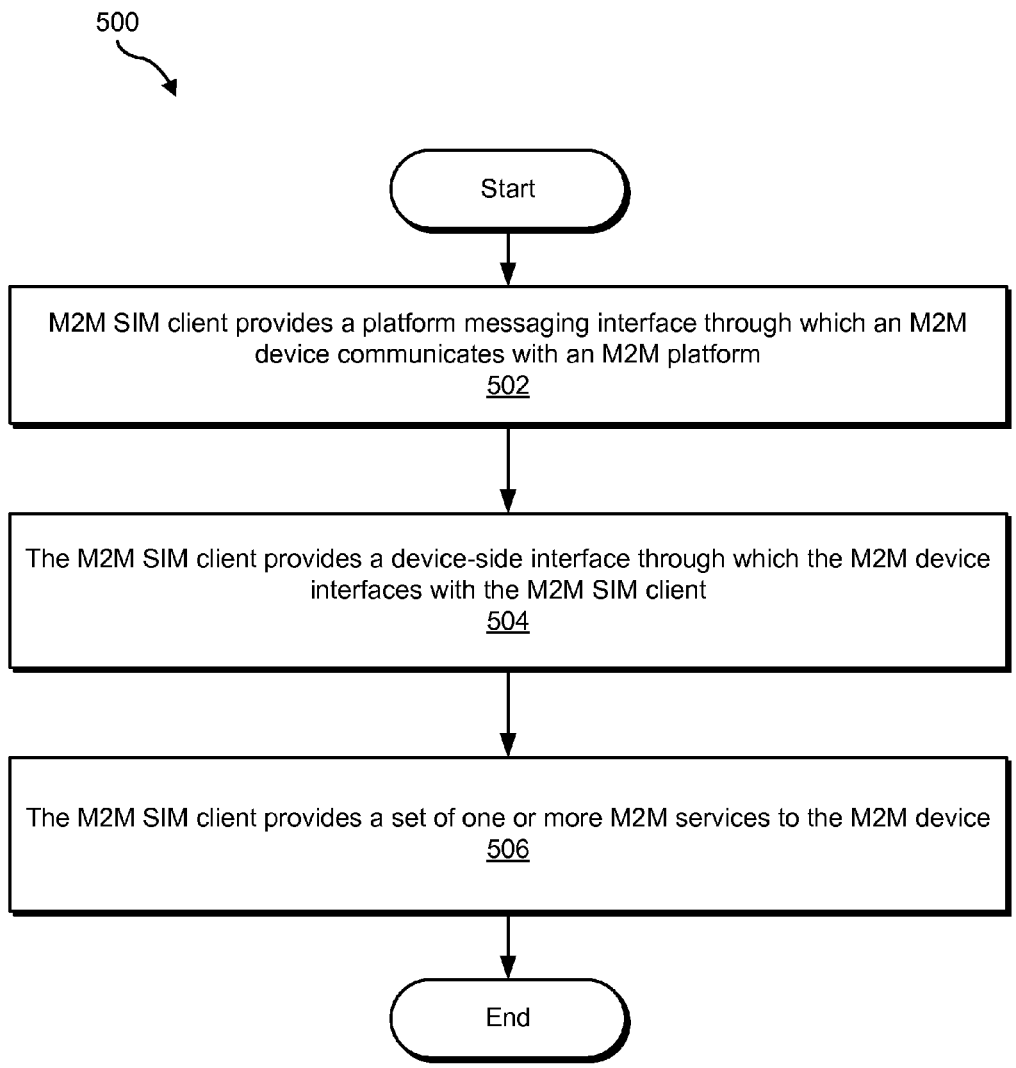
FIG. 5 illustrates an exemplary M2M SIM client method according to principles disclosed herein.

FIG. 5 illustrates an exemplary M2M SIM client method 500. While FIG. 5 illustrates exemplary steps according to one embodiment, other embodiments may omit, add to, reorder, combine, and/or modify any of the steps shown in FIG. 5. In certain examples, one or more of the steps shown in FIG. 5 may be performed by an M2M SIM client (e.g., M2M SIM client 102) and/or any implementation thereof.

In step 502, an M2M SIM client provides a platform messaging interface through which an M2M device communicates with an M2M platform. For example, M2M SIM client 102 implemented by M2M device 101 may provide platform messaging interface 302, which may support communications between M2M device 101 and M2M platform subsystem 106 in any suitable way, including in any of the ways described herein.

In step 504, the M2M SIM client provides a device-side interface through which the M2M device interfaces with the M2M SIM client. For example, M2M SIM client 102 implemented by M2M device 101 may provide device-side interface 304, which may support communications between M2M device 101 (e.g., device-side client 202 and/or one or more other components of M2M device 101) and M2M SIM client 102.

In step 506, the M2M SIM client provides a set of one or more M2M services to the M2M device. For example, M2M SIM client 102 implemented by M2M device 101 may provide any set of the exemplary M2M services described herein for access by M2M device 101 (e.g., by device-side client 202 and/or one or more other components of M2M device 101).

In certain embodiments, one or more of the processes described herein may be implemented at least in part as instructions embodied in a non-transitory computer-readable medium and executable by one or more computing devices. In general, a processor (e.g., a microprocessor, microcontroller, etc.) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 6:
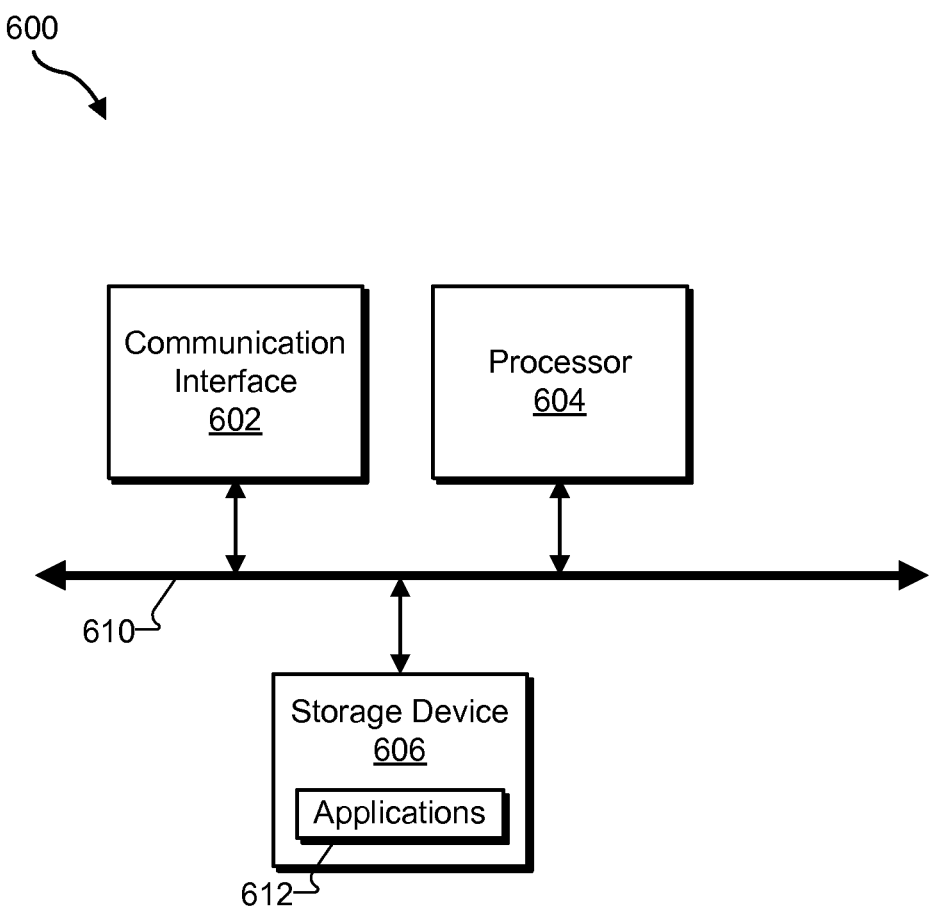
FIG. 6 illustrates an exemplary computing device according to principles described herein.

FIG. 6 illustrates an exemplary computing device 600 that may be configured to perform one or more of the processes described herein. As shown in FIG. 6, computing device 600 may include a communication interface 602, a processor 604, and a storage device 606, communicatively connected via a communication infrastructure 610. While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, and any other suitable interface.

Processor 604 generally represents any type or form of processing unit capable of processing data or interpreting, executing, and/or directing execution of one or more of the instructions, processes, and/or operations described herein. Processor 604 may execute and/or direct execution of operations as directed by one or more applications 612 (which may include one or more software applications) or other computer-executable instructions such as may be stored in storage device 606 or another computer-readable medium.

Storage device 606 may include one or more physical data storage media, devices, or configurations and may employ any type, form, and combination of data storage media and/or device. For example, storage device 606 may include, but is not limited to, a hard drive, network drive, flash drive, magnetic disc, optical disc, random access memory ("RAM"), dynamic RAM ("DRAM"), other non-volatile and/or volatile data storage units, other computer-readable memory, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606.

In some examples, any of the systems and/or system components described herein may be implemented by or within one or more components of computing device 600. For example, one or more applications 612 residing within storage device 606 may be configured to direct processor 604 to perform one or more processes or functions associated with M2M system 100, M2M device 101, M2M SIM client 102, or one or more components of M2M system 100, M2M device 101, and/or M2M SIM client 102. In certain examples, computing device 600 may comprise a SIM, such as SIM 204, and applications 612 may include M2M SIM client 102. Additionally or alternatively, data described herein may be stored by storage device 606.

While certain examples illustrated herein are described in reference to an M2M solution and/or platform, one or more principles may be expanded beyond a strictly M2M solution and/or platform. For example, one or more of the principles described herein may be applied to solutions and/or platforms for interconnecting machines, such as in an Internet of Things ("IoT") implementation or other machine-interconnection implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A machine-to-machine ("M2M") device comprising:
    a device-side client implemented on the M2M device;
    a subscriber identification module ("SIM") card installed in the M2M device and comprising at least one processor; and
    an M2M SIM client implemented on the SIM card and that includes executable instructions configured to direct the at least one processor to:
        provide a platform messaging interface through which the M2M device communicates with an M2M platform subsystem by way of a wireless network,
        provide a device-side interface through which the device-side client implemented on the M2M device interfaces with the M2M SIM client, and provide a set of one or more M2M services to the M2M device for managing a plurality of in-field sensor devices communicatively coupled to, and separate from, the M2M device, the set of one or more M2M services comprising one or more M2M platform services accessible from the M2M platform subsystem, wherein the providing of the one or more M2M platform services comprises sending, through the platform messaging interface and by way of the wireless network, one or more messages to the M2M platform subsystem to access the one or more M2M platform services from the M2M platform subsystem and receiving, through the platform messaging interface and by way of the wireless network, one or more additional messages from the M2M platform subsystem and associated with the one or more M2M platform services, and the M2M device is configured to function as a gateway to the M2M platform subsystem for the plurality of in-field sensor devices.

2. The M2M device of claim 1, wherein the set of one or more M2M services comprises only M2M services that are usable across different M2M solutions.

3. The M2M device of claim 1, wherein the providing of the set of one or more M2M services comprises:
performing, by the M2M SIM client, a discovery process to discover the M2M device to the M2M platform subsystem; and
reporting, by the M2M SIM client to the M2M platform subsystem in conjunction with the discovery process and by way of the platform messaging interface, the set of one or more M2M services supported by the M2M SIM client.

4. The M2M device of claim 1, wherein the providing of the set of one or more M2M services comprises performing, by the M2M SIM client, a configuration process to configure the M2M device.

5. The M2M device of claim 1, wherein the providing of the set of one or more M2M services comprises:
receiving, by the M2M SIM client, a device wakeup message from the M2M platform system; and
forwarding, by the M2M SIM client, the device wakeup message to the M2M device to initiate a wakeup process to wake up the M2M device.

6. The M2M device of claim 1, wherein the providing of the set of one or more M2M services comprises facilitating, by the M2M SIM client, an establishment of a data connection between the M2M device and the M2M platform subsystem by way of the wireless network.

7. The M2M device of claim 1, wherein the providing of the set of one or more M2M services comprises:
obtaining, by the M2M SIM client, at least one of performance data, analytics data, status data, and sensor reading data from the M2M device; and
delivering, by the M2M SIM client, the at least one of the performance data, analytics data, status data, and sensor reading data to the M2M platform subsystem by way of the wireless network.

8. The M2M device of claim 1, wherein the providing of the set of one or more M2M services comprises:
receiving, by the M2M SIM client, a device control command from the M2M platform subsystem; and
forwarding, by the M2M SIM client, the device control command to the M2M device.

9. The M2M device of claim 8, wherein the device control command comprises a request for the M2M device to update a preferred roaming list ("PRL") maintained by the M2M device.

10. The M2M device of claim 1, wherein the providing of the set of one or more M2M services comprises:
receiving, by the M2M SIM client, a software update from the M2M platform subsystem; and
performing, by the M2M SIM client, the software update to update one of the M2M SIM client and a device-side client installed on the M2M device.

11. The M2M device of claim 1, wherein the set of one or more M2M services comprises:
a set of one or more M2M services usable across different M2M solutions; and
another set of one or more M2M services customized to a specific M2M solution.

12. The M2M device of claim 11, wherein the providing of the set of one or more M2M services comprises converting, by the M2M SIM client, parameter data.

13. The M2M device of claim 11, wherein the providing of the set of one or more M2M services comprises authenticating the M2M device based on a SIM identifier for a SIM implemented on the SIM card and a device identifier for the M2M device.

14. The M2M device of claim 11, wherein the providing of the set of one or more M2M services comprises:
obtaining, by the M2M SIM client, sensor readings data from a set of one or more sensors included in the plurality of in-field sensor devices; and
detecting, by the M2M SIM client, an occurrence of an event based on the sensor readings data and a predefined event detection heuristic.

15. A subscriber identification module ("SIM") card configured to be installed in a wireless device, the SIM card comprising:
a processor; and
an M2M SIM client configured to direct the processor to:
provide a platform messaging interface through which the wireless device communicates with an M2M platform subsystem by way of a wireless network,
provide a device-side interface through which the wireless device interfaces with the M2M SIM client, and
provide a set of one or more M2M services to the wireless device for managing a plurality of in-field sensor devices communicatively coupled to, and separate from, the wireless device, the set of one or more M2M services comprising one or more M2M platform services accessible from the M2M platform subsystem, wherein the providing of the one or more M2M platform services comprises sending, through the platform messaging interface and by way of the wireless network, one or more messages to the M2M platform subsystem to access the one or more M2M platform services from the M2M platform subsystem and receiving, through the platform messaging interface and by way of the wireless network, one or more additional messages from the M2M platform subsystem and associated with the one or more M2M platform services, and the wireless device is configured to function as a gateway to the M2M platform subsystem for the plurality of in-field sensor devices.

16. The SIM card of claim 15, wherein the set of one or more M2M services comprises only M2M services that are universally usable across different M2M solutions.

17. The SIM card of claim 15, wherein the set of one or more M2M services comprises:
   a set of one or more M2M services usable across different M2M solutions; and
   a set of one or more M2M services customized to a specific M2M solution.

18. A method comprising:
   directing, by a machine-to-machine ("M2M") subscriber identification module ("SIM") client implemented on a SIM card installed in an M2M device, a processor included on the SIM card to provide a platform messaging interface through which the M2M device communicates with an M2M platform subsystem by way of a wireless network;
   directing, by the M2M SIM client, the processor to provide a device-side interface through which the M2M device interfaces with the M2M SIM client, and
   directing, by the M2M SIM client, the processor to provide a set of one or more M2M services to the M2M device for managing a plurality of in-field sensor devices communicatively coupled to, and separate from, the M2M device, the set of one or more M2M services comprising one or more M2M platform services accessible from the M2M platform subsystem, wherein
      the providing of the one or more M2M platform services comprises sending, through the platform messaging interface and by way of the wireless network, one or more messages to the M2M platform subsystem to access the one or more M2M platform services from the M2M platform subsystem and receiving, through the platform messaging interface and by way of the wireless network, one or more additional messages from the M2M platform subsystem and associated with the one or more M2M platform services, and
      the M2M device is configured to function as a gateway to the M2M platform subsystem for the plurality of in-field sensor devices.

19. The method of claim 18, wherein the set of one or more M2M services comprises only M2M services that are usable across different M2M solutions.

20. The method of claim 18, wherein the set of one or more M2M services comprises:
   a set of one or more M2M services usable across different M2M solutions; and
   a set of one or more M2M services customized to a specific M2M solution.

21. The M2M device of claim 1, wherein
   the set of one or more M2M services further comprises one or more M2M device services, and
   the one or more M2M device services are provided independently of the M2M platform subsystem.

22. The M2M device of claim 1, wherein
   the M2M SIM client includes a set of one or more SIM client framework ("SCF") modules configured to enable access to the one or more M2M platform services from the M2M platform subsystem.

* * * * *